United States Patent [19]

Clouse et al.

[11] Patent Number: 4,916,791
[45] Date of Patent: Apr. 17, 1990

[54] BALL BEARING PULLER ATTACHMENT

[76] Inventors: Mary A. Clouse, 2249 E. Leland Rd., Apt. 238, Pittsburg, Calif. 94565; David E. Voorhis, 815 Murray Ave., San Luis Obispo, Calif. 93401

[21] Appl. No.: 385,073
[22] Filed: Jul. 26, 1989
[51] Int. Cl.$^4$ ............................................. B23P 17/04
[52] U.S. Cl. ................................................... 29/261
[58] Field of Search ................ 29/256, 258, 259–262, 29/263, 265, 281.1, 283; 294/82.1, 81.56

[56] References Cited

U.S. PATENT DOCUMENTS

| | | | |
|---|---|---|---|
| 2,052,304 | 8/1936 | Kaplan | 29/262 |
| 3,074,156 | 1/1963 | Hinrichsen et al. | 29/262 |
| 3,145,959 | 8/1964 | Shiffman | 29/262 |
| 4,117,581 | 10/1978 | Brodie | 29/261 |

FOREIGN PATENT DOCUMENTS 1023050  3/1966  United Kingdom ................. 29/261

Primary Examiner—Robert C. Watson

[57] ABSTRACT

The invention comprises two or more links for connecting a ball bearing puller where the outer surfaces of both races of the assembly are both engaged with mating surfaces of an associated machine. The links are arranged so that one end of each link engages and grips the internal groove of the outer race of the assembly. The other end of each link is engaged with a ring which may be pulled by means of a standard ball bearing puller to remove the assembly from the machine.

18 Claims, 3 Drawing Sheets

BALL BEARING PULLER ATTACHMENT

BACKGROUND OF THE INVENTION

This invention relates to ball bearing pullers, and more particularly it relates to an attachment for a standard ball bearing puller for removing a ball bearing assembly from a machine where the outer surfaces of both races are engaged with mating surfaces of the machine.

Where the outer surfaces of both races of a ball bearing assembly in a machine, such as found in automotive transmissions, are both engaged with mating surfaces and there is access to only one side of the assembly, a serious problem arises as to how to remove the assembly, since the only parts of the assembly which may be gripped are the grooves in the races. Standard ball bearing pullers cannot be used in these instances since they cannot be engaged with the grooves. Instead they rely on having access to the outer edges of the bearing. Commonly, where only the grooves can be gripped, the assemblies are crudely removed by destruction of the assembly such as with torches, grinders, chisels and saws. As a result of this kind of removal, other parts of the machine from which the ball bearing assembly is being removed can be damaged. Also substantial effort is often required to remove an assembly in this way.

SUMMARY OF THE INVENTION

It is an object of the invention to remove a ball bearing assembly from a machine in which it is mounted without destruction of the machine or the ball bearing assembly.

Another object is to provide an inexpensive accessory for a standard ball bearing puller for easily removing ball bearing assemblies of various sizes from machines where the outer surfaces of both races of the assembly are engaged with mating surfaces.

Another object is to provide a structure that may be easily engaged in the grooves of the races of a ball bearing assembly mounted in a machine and connected to a standard ball bearing puller for removing the assembly from the machine.

In brief, the invention is a series of links for connecting a ball bearing assembly to a standard ball bearing puller where the outer surfaces of both races of the assembly are both engaged with mating surfaces of an associated machine. The links are arranged so that one end of each link engages and grips the internal groove of one of the races of the assembly. The other end of each link is engaged with a ring which may be pulled by means of a standard ball bearing puller to remove the ball bearing assembly from the machine.

Other objects and advantages of the invention will be apparent in a description of a specific embodiment thereof, given by way of example only, to enable one skilled in the art to readily practice the invention which is described hereinafter with reference to the accompanying drawing.

DESCRIPTION OF AN EMBODIMENT

Reference will now be made in detail to a present preferred embodiment of the invention, an example of which is illustrated in the accompanying drawing. While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
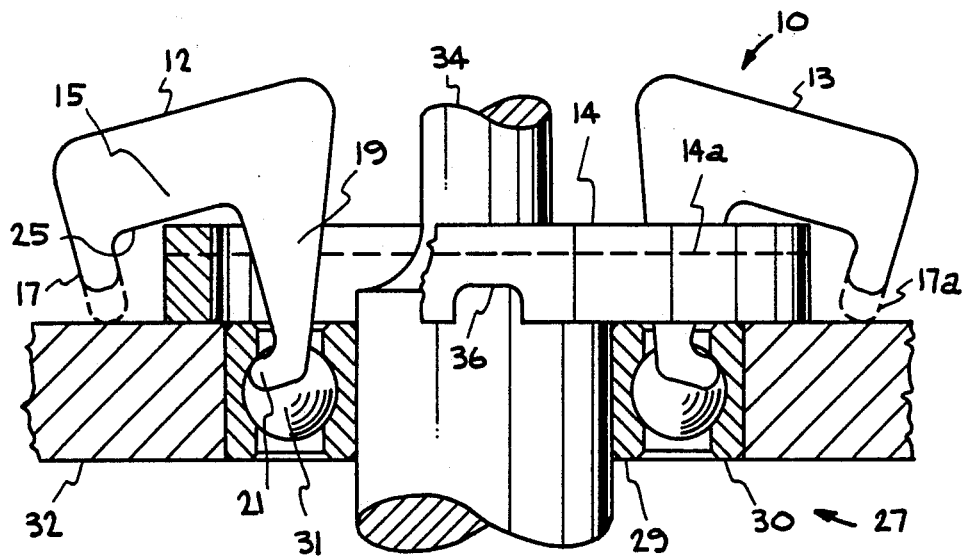
FIG. 1 is a perspective view, with portions broken away, of a ball bearing puller attachment in relaxed engagement with a ball bearing assembly to be removed from a housing, according to the invention.

Referring to the drawing there is shown in FIG. 1 a ball bearing puller attachment 10 comprising a pair of links 12 and 13 and a ring 14. Each link includes a body 15 having a finger 17 extending from one end and an arm 19 extending from the other end. The arm 19 terminates in a hook 21. The body 12, finger 17 and arm 19 define a channel having an edge 25 which rests on the ring 14.

In operation of the attachment 10, for example to remove a ball bearing assembly 27 that comprises an inner race 29, an outer race 30 and ball bearings 31 from a housing 32 and shaft 34, the ring 14 is placed on the housing 32 concentric with the shaft 34. The links 12 and 13 are positioned so that the hooks 21 slip into the space between the inner and outer races and between adjacent ball bearings.

It is expected in the use of the invention that the shaft 34 will be oriented vertically such as in an automotive transmission after it has been removed from a vehicle. Thus the ring 14 and the links 12 and 13 initially will be held in place by gravity, with the edge 25 resting on the ring 14. The width of the edges 25 are flat so that the links will rest stably in a vertical position. A ring 14a with a narrow width could be Provided as an alternative to ring 14. With ring 14a, the finger 17 will rest in a position 17a on the housing 32 as well as the edge 25 resting on the ring 14a. This arrangement provides additional stability for the links 12 and 13 to rest in their initial position.

Figure 2:
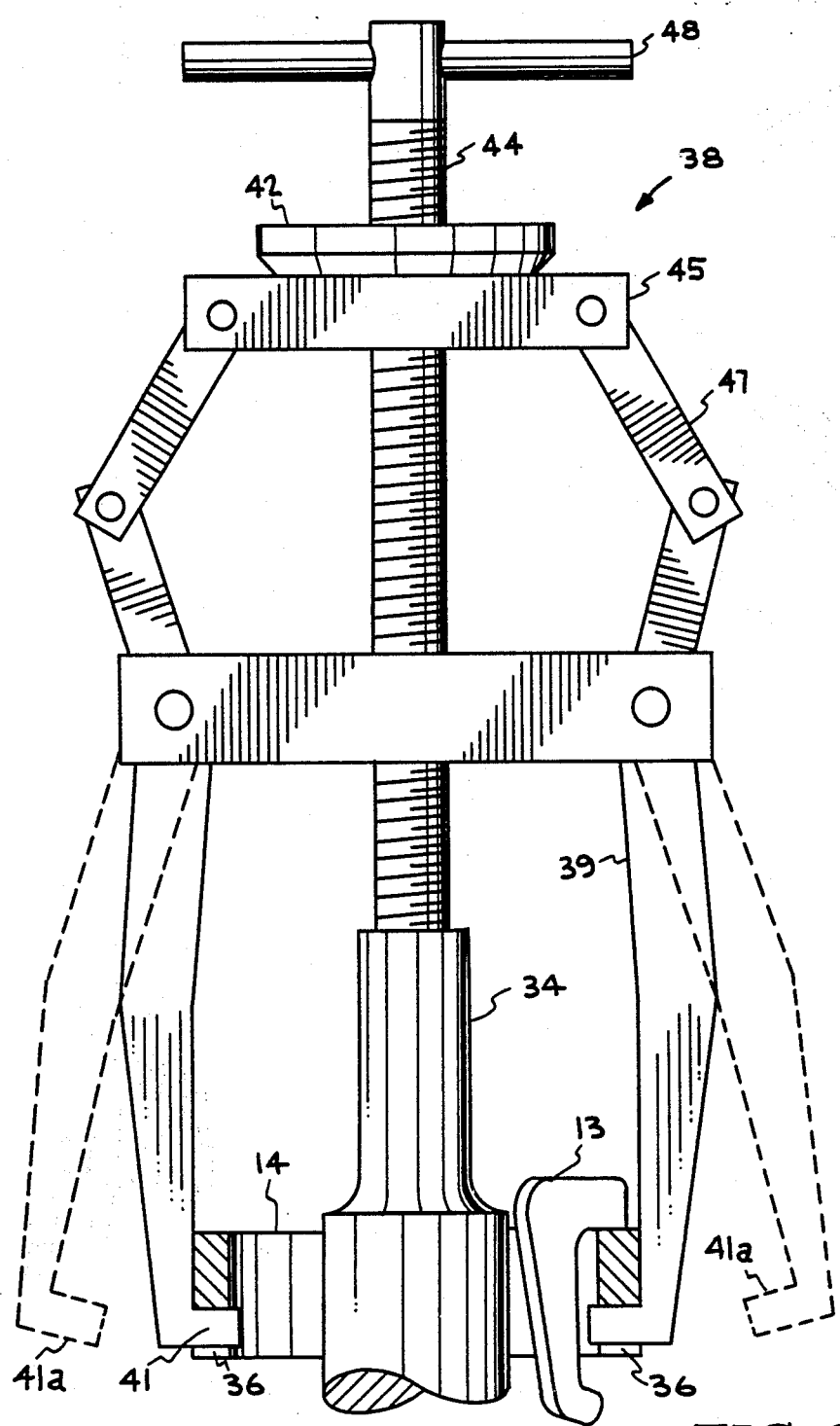
FIG. 2 is a diagram of a standard ball bearing puller in engagement with the ball bearing puller attachment of FIG. 1 for removal of the ball bearing assembly from the housing.

In order to remove the ball bearing assembly 27 from the housing 32, a pair of notches 36 spaced 180 degrees apart are provided in the ring 14. A standard ball bearing puller 38 (FIG. 2) includes rotatable legs 39 having feet 41 which may be rotated from a position 41a into engagement with the notches 36 in the ring 14. The puller 38 also includes a locking nut 42 mounted on a screw 44 for engagement with the outer end of shaft 34. With the feet 41 rotated into engagement with the ring 14, the nut 42 is turned against a member 45 to lock the feet 41 of the legs 39, through pivoting arms 47, into the notches 36.

Figure 3:
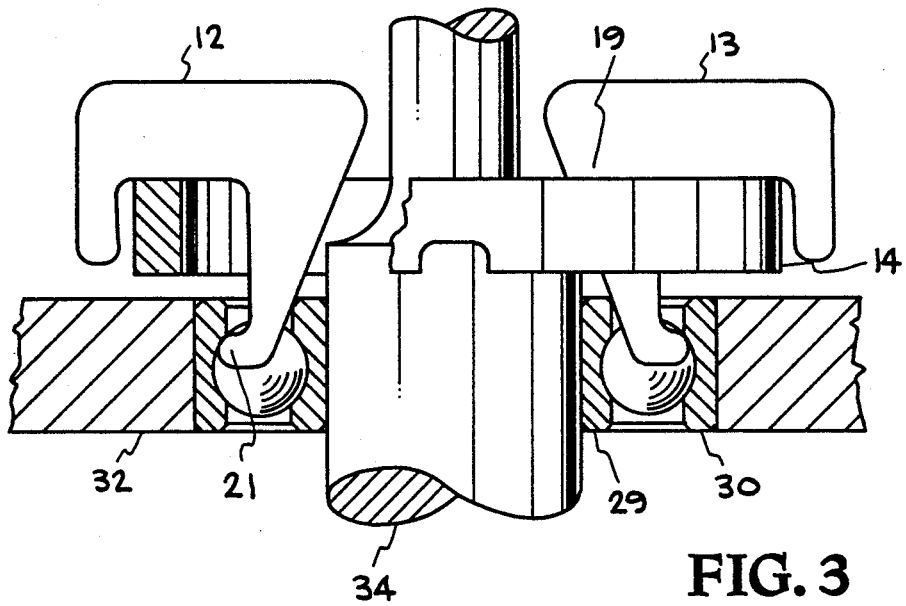
FIG. 3 is a perspective view of the ball bearing attachment of FIG. 1 with additional portions broken away and in a position of forced engagement with the ball bearing assembly just prior to additional forces being applied to remove the assembly from the housing.

As a handle 48 in the end of the screw 44 is turned, the ring 14 is lifted upward so that the links 12 and 13 (FIG. 3) are rotated toward the shaft 34 so that the hooks 21 are brought into firm engagement with the races 29 and 30. Further rotation of the links is prevented by engagement of the rear edge of the arms 19 with the inner race 29 and the engagement of the hooks 21 with the outer race 30.

Further rotation of the screw 44 results in the races 29 and 30, and therefore the entire ball bearing assembly, being smoothly lifted and removed from the housing 32.

Figure 4:
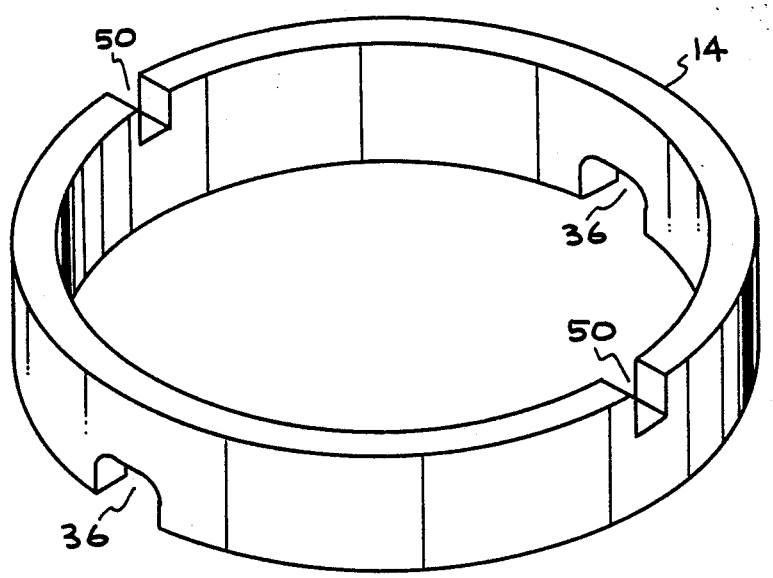
FIG. 4 is a perspective view of a ring used in the ball bearing puller attachment of FIG. 1 modified to include notches for facilitating the stable positioning of attachment links prior to applying force to the attachment with the standard puller.

As an aid to stabilizing the links 12 and 13 in their initial position, notches 50 (FIG. 4) may be provided in the ring 14 in which to stably rest the links.

Figure 5:
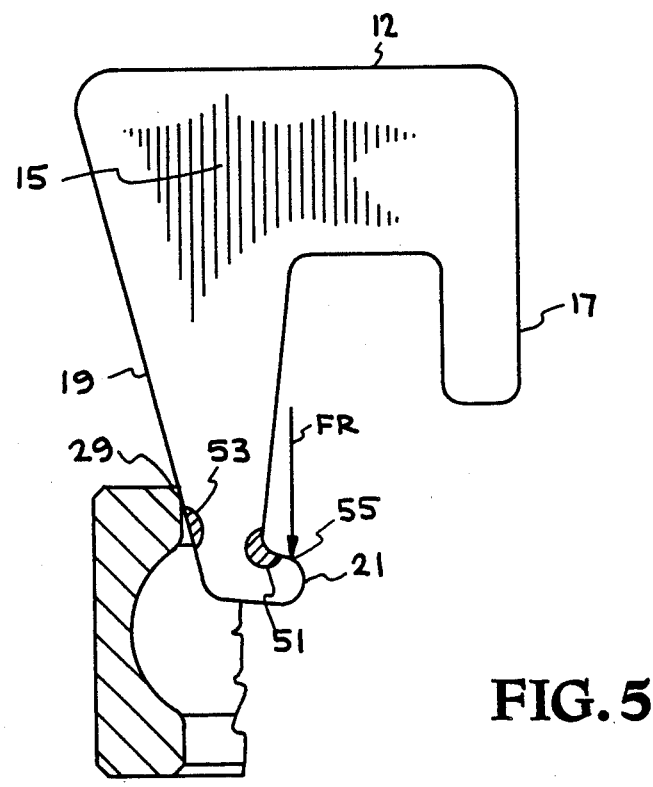
FIG. 5 is plan view of a link closely proportioned to a link actually built that would be useful for removing ball bearing assemblies from automotive transmissions.

In FIG. 5 is shown an enlarged view of the links 12 or 13 that is closely in proportion to links actually built and used. A computer analysis of the critical stress volumes, when such a link is used to pull a ball bearing assembly, showed the most critical volume to be a volume 51 between the juncture of hook 21 and arm 19. A volume 53, just below the point where the arm 19 contacts the upper edge of inner race 29, was found to be the second most critical volume. It was assumed that a removal force FR was applied at a point 55 where the hook contacts the upper edge of the outer race. It will be observed that the body 15 and upper portion of the arm 19 are heavily proportioned so that there is no question of their being overstressed in operation. Thus, the main focus of designed strength for the link is in the hook area, particularly in volumes 51 and 53. Thus the strength and thickness of the metal chosen for the link should be sufficient to resist any strain in the volumes 51 and 53 for the forces expected in operation.

It will be observed that the overall shape of the link is such as to easily position it for operation. Moreover, it is a simple shape that is easy to machine or stamp. Yet there are only two critical stress volumes to be considered in the design. Thus, there is maximum strength in the link, and the critical volumes are limited to the volumes 53 and 55 near the hook 21. It should also be noted that where the outer race instead of the inner race is engaged by the hooks, there is more contact area for the hook and a larger space is available for a larger hook as opposed to a smaller hook that would be required for engaging the inner race. This advantageous shape can only be used for a link where the hook engages the outer race. Any design attempt to make a link with a hook that engages the inner race will result in an altered shape of the link that does not have the advantages of the inventive links.

Since the links 12 and 13 are not permanently attached to the ring 14 , the links are easily and inexpensively replaced in the event of loss or damage. In addition, as many links as needed, up to the number of spaces between balls 31, can be used such as when a bearing assembly is particularly difficult to remove. Also, different diameter rings 14 can be used for different size ball bearing assemblies, while the same links can be used for a wide range of sizes. The invention, therefore, is an inexpensive and very flexible addition to a standard ball bearing puller and would be useful in conjunction with a range of different size pullers.

The links 12 and 13 for a ball bearing puller attachment 10 constructed according to the invention were made of a high strength hot rolled steel of S.A.E. 4130 having a yield strength=60 kpsi; tensile strength (fatigue in bending)=90 kpsi; elongation in 2 in., % 30; reduction in area, $S=45$; and Brinell hardness, $HB=183$. The links were heated in a 1600 degree Fahrenheit oven for approximately 20 minutes until they were red hot. They were then immediately quenched in oil and then cleaned. The tensile strength after cleaning was 182-194 kpsi.

A three quarter inch length of steel pipe (OD=3.5 in. and ID=3 in.) was cut to make the ring 14. On opposite sides of the ring two notches 36 were ground 180 degrees apart (height=0.375" and width=0.5").

A Mazda B2000 transmission was used to test the final prototype.

After removing both transmission snap rings, the ring 14 was placed on the transmission case 32 around the bearing assembly 27. The removal force was calculated to be 896 lbs. Although this force was considered to be unexpectably high, it was decided to first try using only two links. They were hooked into the outer race, with their edges 25 resting on the ring. A standard two leg puller 38 was put on the shaft 34 and the puller legs were adjusted to grab the ring's notches 36. The screw 44 was turned, the links 12 and 13 pivoted into place, the screw was turned more and the bearing assembly 27 smoothly slipped off the shaft.

For more complete details and analysis of the invention, reference is made to a senior project report by Mary Clouse, "Ball Bearing Puller Attachment," Mechanical Engineering Department, California Polytechnic State University, San Luis Obispo, CA, submitted Dec. 18, 1988.

It is to be understood that the foregoing description is merely illustrative of a preferred embodiment of the invention, that the scope of the invention is not to be limited thereto but is to be determined by the scope of the appended claims and that further examples of the invention and modification thereof will be apparent to those skilled in the art without departing from the spirit of the invention.

What is claimed is:

1. A ball bearing puller attachment for a standard ball bearing puller for removing a ball bearing assembly in an axial direction from a shaft and a housing, said assembly having an inner race and an outer race, each of said races having an internal groove, comprising:
   a ring having means including notches for pulling engagement in the axial direction with the standard ball bearing puller; and
   a linking means having means for pulling engagement in the axial direction with the internal groove of the outer race, said linking means having means for pulling engagement with said ring in the axial direction, said linking means axially engaging the groove only in the outer race for pulling the assembly from the housing and shaft when force is applied to the ring by the standard ball bearing puller.

2. The attachment of claim 1, wherein said linking means is a plurality of links to be equally spaced around said ring.

3. The attachment of claim 1, wherein said ring includes notches for stable initial positioning of said links.

4. The attachment of claim 1, wherein said means for pulling engagement with said race and said means for pulling engagement with said ring extend in the same direction from said linking means.

5. The attachment of claim 1, wherein said linking means is a plurality of links, each link comprising a hook for engagement with the outer race of the ball bearing assembly:

an arm integral with said hook; and a body extending from said arm in the same direction as said hook at the end of said arm opposite said hook.

6. The attachment of claim 5 wherein each of said links includes a finger for stable initial positioning for each of said links.

7. The attachment of claim 5, wherein each link further includes a finger extending from said body at the end of said body opposite said arm and in the same direction of said arm.

8. A ball bearing puller attachment for a standard ball bearing puller, comprising:
- a ring for engagement with a standard ball bearing puller;
- a first link having an extension for engagement with said ring extending in a direction that is radially outward to said ring, said first link having a hook extending for engagement with the outer race of the ball bearing assembly in a direction that is radially outward to the race; and
- a second link having an extension that extends for engagement with said ring in a direction that is radially outward to said ring and at a location spaced from said first link, said second link having a hook extending for engagement with the outer race of the ball bearing assembly in a direction that is radially outward to the race.

9. The attachment of claim 8, wherein said ring has notches in said ring spaced 180 degrees apart for engagement with a standard ball bearing puller.

10. The attachment of claim 9, wherein said ring includes a notch for each of said links for stable initial positioning of said links.

11. The attachment of claim 8, wherein each of said links includes a finger for stable initial positioning of said links.

12. The attachment of claim 8, wherein said links are made of high strength hot rolled steel.

13. The attachment of claim 12, wherein said links have been heat treated at 1600 degrees F. for approximately 20 minutes.

14. A link for a ball bearing puller attachment accessory for a standard ball bearing puller, comprising;
- a hook for engagement with the outer race of a ball bearing assembly;
- an arm integral with said hook and having a width that increases smoothly and continuously from the width at said hook to a width at the opposite end that is at least twice the width at the hook;
- a body extending from said arm in the same direction as said hook, said body being at the end of said arm opposite said hook and having a width equal to at least the maximum width of said arm.

15. A link according to claim 14, further including a finger extending from said body at the end of said body opposite said arm and in the same direction of said arm.

16. A link according to claim 15, wherein said link is made of high strength hot rolled steel that has been heat treated at 1600 degrees F. for approximately 20 minutes.

17. The link of claim 14, wherein said link is made of S.A.E. 4130, 4140 or 4142 steel.

18. The link of claim 14, wherein said link is made of S.A.E. 4130 steel.

* * * * *